(12) United States Patent
Kukuk et al.

(10) Patent No.: US 10,898,030 B2
(45) Date of Patent: Jan. 26, 2021

(54) COUNTERTOP APPLIANCE HAVING FLOATING MOUNTING ASSEMBLY TO ACCOMMODATE EXPANSION AND CONTRACTION OF COOKING SURFACE

(71) Applicant: National Presto Industries, Inc., Eau Claire, WI (US)

(72) Inventors: Jesse Kukuk, Chippawa Falls, WI (US); Ryan H. Barrows, Eau Claire, WI (US)

(73) Assignee: National Presto Industries, Inc., Eau Claire, WI (US)

( * ) Notice: Subject to any disclaimer, the term of this patent is extended or adjusted under 35 U.S.C. 154(b) by 246 days.

(21) Appl. No.: 16/043,648

(22) Filed: Jul. 24, 2018

(65) Prior Publication Data
US 2020/0029732 A1 Jan. 30, 2020

(51) Int. Cl.
*A47J 37/06* (2006.01)
*A47J 27/00* (2006.01)

(52) U.S. Cl.
CPC .......... *A47J 37/067* (2013.01); *A47J 27/002* (2013.01); *A47J 37/0676* (2013.01)

(58) Field of Classification Search
CPC ... A47J 37/067; A47J 37/0676; A47J 37/0694
USPC .......................................................... 99/422
See application file for complete search history.

(56) References Cited

U.S. PATENT DOCUMENTS

| | | |
|---|---|---|
| 345,530 A | 7/1886 | Paris |
| 1,015,584 A | 1/1912 | Powell |
| 2,274,285 A | 2/1942 | Walker |
| D139,751 S | 12/1944 | Springwell |
| 2,547,982 A | 4/1951 | Sivley |
| D187,835 S | 5/1960 | Lee |
| D229,448 S | 11/1973 | Traclet |
| 4,455,926 A * | 6/1984 | Paaskesen ............... A21B 3/15 99/422 |
| D281,215 S | 11/1985 | Lastuck |
| D285,523 S | 9/1986 | Ayukawa et al. |
| D286,494 S | 11/1986 | Lastuck |
| D289,847 S | 5/1987 | Okamoto |

(Continued)

OTHER PUBLICATIONS

Presto® 20-inch Cool Touch Electric Griddle, webpage, http://www.gopresto.com/products/products.php?stock=07030, Nov. 7, 2011, 2 pages.

(Continued)

*Primary Examiner* — Reginald Alexander

(57) ABSTRACT

A countertop appliance and related methods of fabrication using a floating mounting assembly to connect a cooking surface to a mounting frame. The floating mounting assembly allows the cooking surface to expand and contract in response to changing temperature without translating these dimensional changes to the mounting frame and negatively impacting the integrity or appearance of the countertop appliance. The floating mounting assembly can include a grommet assembly that connects to elongated apertures defined in the mounting frame. As the cooking surface expands and contracts, the grommet assembly can slide within the elongated aperture. Through the use of the elongated aperture, dimensional changes in the cooking surface are not directly translated to the mounting frame.

11 Claims, 4 Drawing Sheets

(56) References Cited

U.S. PATENT DOCUMENTS

| | | | |
|---|---|---|---|
| D296,509 S | 7/1988 | Fuke | |
| D335,240 S | 5/1993 | Critchfield et al. | |
| 5,414,956 A | 5/1995 | Kheradpir | |
| D366,390 S | 1/1996 | Vitantonio | |
| D375,868 S | 11/1996 | Larson | |
| 5,740,723 A | 4/1998 | Lin | |
| D409,041 S | 5/1999 | Barker | |
| D412,808 S | 8/1999 | Hinton et al. | |
| 6,016,741 A | 1/2000 | Tsai et al. | |
| 6,064,042 A | 5/2000 | Glucksman et al. | |
| D431,152 S | 9/2000 | Lee | |
| D436,796 S | 1/2001 | Kalina et al. | |
| 6,186,055 B1 | 2/2001 | DeMars et al. | |
| D441,250 S | 5/2001 | Choi | |
| 6,341,555 B1 * | 1/2002 | Chang | A47J 27/2105 |
| | | | 219/433 |
| 6,472,644 B1 | 10/2002 | Wu | |
| D471,990 S | 3/2003 | Riccobene | |
| D483,224 S | 12/2003 | Clark | |
| D484,737 S | 1/2004 | Bodum | |
| D500,629 S | 1/2005 | Huggler | |
| D505,044 S | 5/2005 | Hei | |
| D514,876 S | 2/2006 | Simond | |
| D533,016 S | 12/2006 | Genslak et al. | |
| D564,826 S | 3/2008 | Chin | |
| D568,095 S | 5/2008 | De'Longhi | |
| D575,098 S | 8/2008 | Seymour | |
| 7,523,697 B2 * | 4/2009 | Hedrington | A47J 37/0676 |
| | | | 219/452.11 |
| D602,597 S | 10/2009 | Nomi | |
| D618,047 S | 6/2010 | Seymour | |
| D644,867 S | 9/2011 | Janvier | |
| D658,429 S | 5/2012 | Berge | |
| 8,211,029 B2 | 7/2012 | Katsumoto | |
| D674,656 S | 1/2013 | Berge et al. | |
| D686,036 S | 7/2013 | Nelson | |
| D696,549 S | 12/2013 | Pennington | |
| D710,148 S | 8/2014 | Mainville | |
| 9,192,178 B2 | 11/2015 | Berge et al. | |
| D745,802 S | 12/2015 | Yao | |
| D760,018 S | 6/2016 | Koszylko | |
| D793,801 S | 8/2017 | Bassill | |
| D801,624 S | 11/2017 | Zsolcsak | |
| D823,047 S | 7/2018 | Seymour | |
| D831,410 S | 10/2018 | Bassill | |
| D851,440 S | 6/2019 | Berge | |
| D852,573 S | 7/2019 | Bassill | |
| D856,742 S | 8/2019 | Mano | |
| D858,177 S | 9/2019 | Berge | |
| D859,061 S | 9/2019 | Hollinger | |
| D859,062 S | 9/2019 | Berge | |
| 2004/0187704 A1 * | 9/2004 | Citrynell | A47J 27/04 |
| | | | 99/422 |
| 2006/0163242 A1 | 7/2006 | Ciancimino et al. | |
| 2009/0084271 A1 * | 4/2009 | Njaastad | A47J 31/54 |
| | | | 99/323.3 |
| 2009/0206093 A1 * | 8/2009 | Knight | A47J 36/02 |
| | | | 220/573.2 |
| 2013/0292371 A1 * | 11/2013 | Braden | F24C 15/34 |
| | | | 219/452.11 |
| 2014/0348987 A1 * | 11/2014 | Cheng | A47J 27/08 |
| | | | 426/231 |
| 2014/0360383 A1 | 12/2014 | Hamlin | |
| 2015/0245742 A1 * | 9/2015 | Barrows | A47J 37/108 |
| | | | 219/432 |
| 2019/0128538 A1 * | 5/2019 | Dahle | F24C 15/28 |

OTHER PUBLICATIONS

Presto® 22-inch Electric Griddle, webpage, http://www.gopresto.com/products/products.php?stock=07039, Nov. 7, 2011, 2 pages.

Presto® 22-inch Electric Griddle with Removable Handles, webpage, http://www.gopresto.com/products/products.php?stock=07061, Nov. 7, 2011, 2 pages.

Presto® Cool Touch Electric Griddle, webpage, http://www.gopresto.com/products/products.php?stock=07047, Nov. 7, 2011, 2 pages.

Presto® Cool Touch Electric Foldaway™ Griddle, webpage, http://www.gopresto.com/products/products.php?stock=07050, Nov. 7, 2011, 2 pages.

Presto® Cool Touch Electric Tilt'nDrain™ Griddle, webpage, http://www.gopresto.com/products/products.php?stock=07045, Nov. 7, 2011, 2 pages.

Presto® Liddle Griddle® mini griddle, webpage, http://www.gopresto.com/products/products.php?stock=07211, Nov. 7, 2011, 2 pages.

Presto® Tilt'nDrain™ BigGriddle cool touch electric griddle, webpage, http://www.gopresto.com/products/products.php?stock=07046, Nov. 7, 2011, 3 pages.

APW Wyott 23780 7 Qt. Notched/Hinged Stainless Steel Inset Cover, webpage, http://www.webstaurantstore.com/apw-wyott-23780-7-qt-notched-hinged-stainless-steel-inset-cover/13523780.html, printed Feb. 2, 2012, 2 pages.

Oster 12-inch Skillet with Hinged Lid, webpage, http://www.oster.com/ProductDetails.aspx?pid=1625, printed Feb. 7, 2012, 1 page.

Application and File History for U.S. Appl. No. 29/647,961, filed May 17, 2018. Inventors: Berge et al.

Application and File History for U.S. Appl. No. 29/694,976, filed Jun. 14, 2019. Inventors: Berge et al.

Application and File History for U.S. Appl. No. 29/694,982, filed Jun. 14, 2019. Inventors: Berge et al.

* cited by examiner

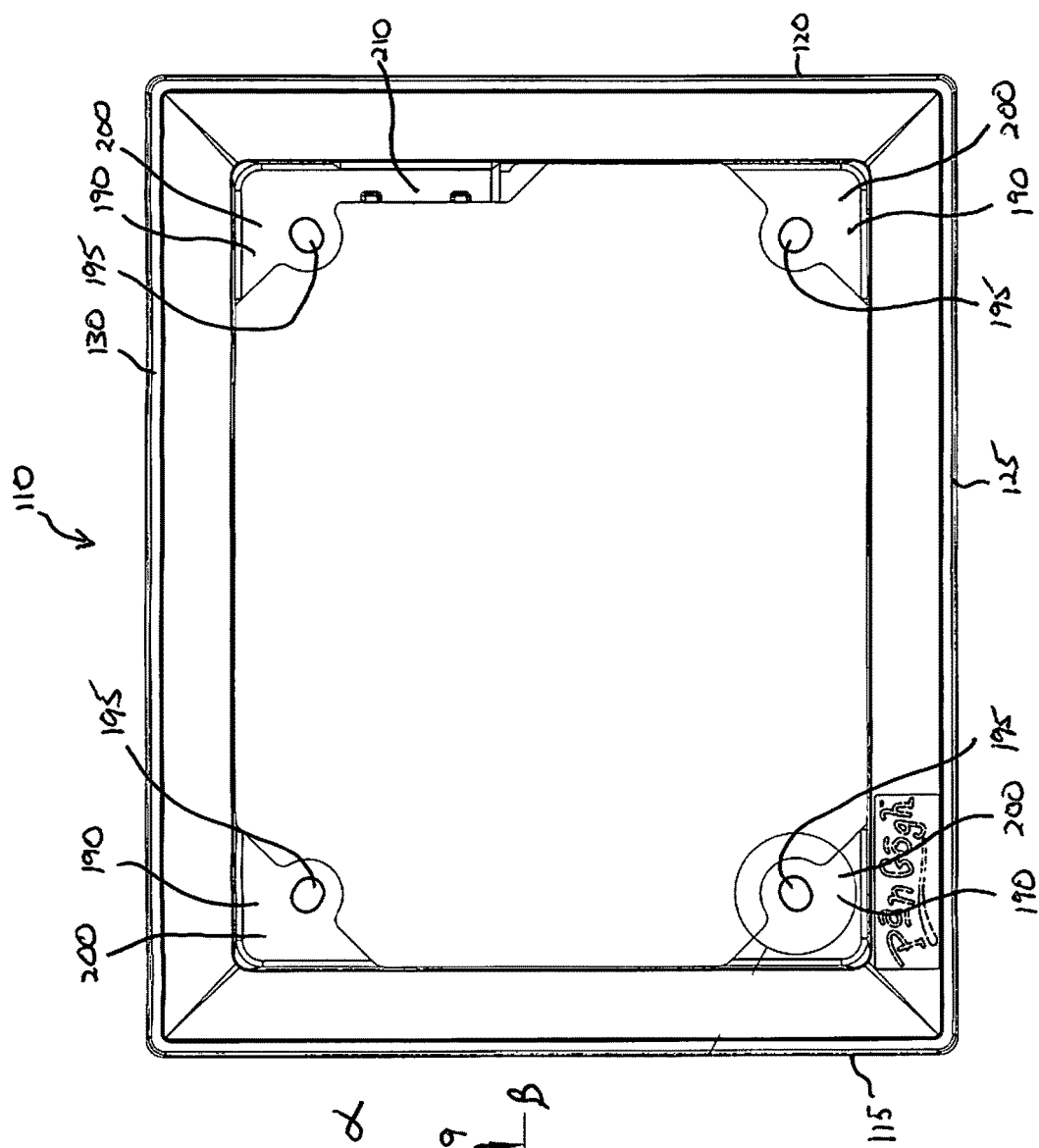
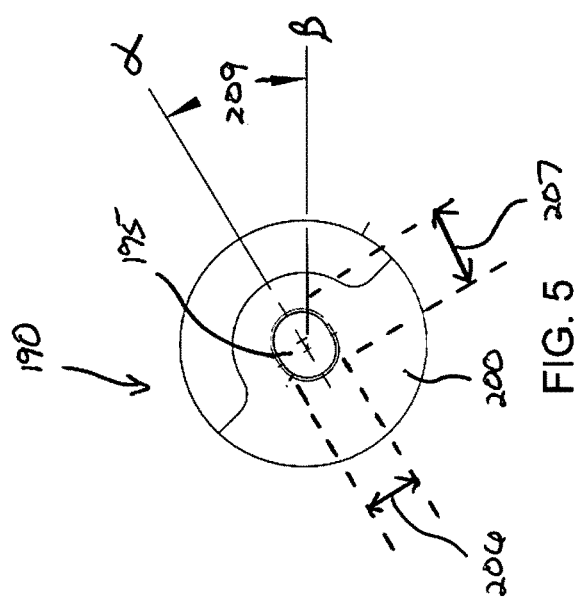
FIG. 2
FIG. 5

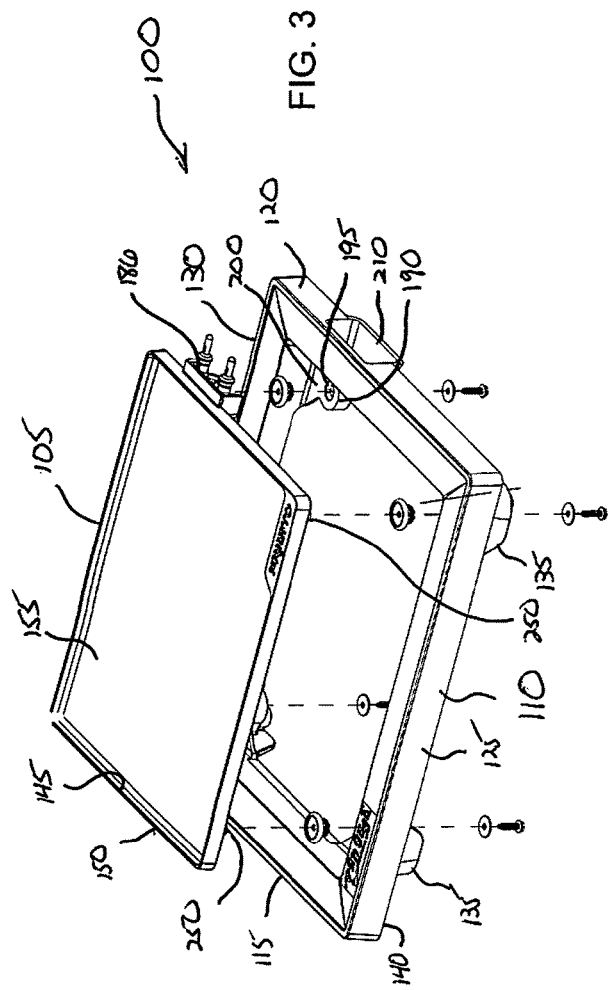

COUNTERTOP APPLIANCE HAVING FLOATING MOUNTING ASSEMBLY TO ACCOMMODATE EXPANSION AND CONTRACTION OF COOKING SURFACE

FIELD OF THE INVENTION

The present invention relates generally to countertop appliances. More specifically, the present invention is directed to a countertop appliance including a floating mounting assembly to allow flexibility for expansion and contraction of a cooking surface during cooking while maintaining the functionality and aesthetic appeal of the countertop appliance.

BACKGROUND OF THE INVENTION

Countertop appliances, such as griddles and skillets, are well known consumer appliances and provide users with a convenient, easy to clean cooking surface. Countertop griddles are frequently used when preparing breakfast items such as, for example, pancakes, French toast, bacon, sausage and various preparations of eggs. During use, the cooking surface expands and contracts in response to increases and decreases in temperature. The continual exposure of the cooking surface to these temperature swings can result in destructive forces to the mounting elements and impact the physical appearance of the appliance. As such, it would be advantageous if the mounting arrangement for cooking surfaces on a conventional countertop appliance were improved to deal with situations in which the cooking surface expands and contracts in response to changing temperatures.

SUMMARY OF THE INVENTION

A countertop appliance of the present invention provides additional mounting stability by utilizing a floating mounting assembly. The floating mounting assembly provides the cooking surface with the ability to expand and contract as heat is applied and removed without exposing a mounting frame to forces resulting from dimensional fluctuations. In a representative embodiment, the floating mount assembly can comprise a grommet mounting configuration to effectively secure the cooking surface to the frame. The grommet mounting configuration remains flexible for expansion and contraction. The cooking surface is secured to the frame via a frame mounting assembly located in all four corners of the frame. With the floating mounting assembly coupled to the frame mounting assembly, a gap is defined between the cooking surface and the frame to accommodate the expansion and contraction of the cooking surface. The frame mounting assembly can define an elongated aperture by which the floating mounting assembly is coupled to the frame. During cooking, the floating mounting assembly allows the cooking surface to expand by allowing a grommet to slide accordingly in the elongated apertures. This prevents any unwanted torque from being applied to the cooking surface and frame, while also maintaining the desired exterior appearance of the countertop appliance. As the cooking surface expands and contracts due to changes in temperature, the floating mounting assembly allows each grommet to adjust/slide evenly within the corresponding elongated aperture, thereby keeping the alignment of the cooking surface symmetrical to the frame.

In one aspect of the present invention, a countertop appliance includes a floating mounting assembly that allows a cooking surface to expand and contract in response to temperature without negatively impacting a mounting frame formed of a different material. Generally, the floating mounting assembly can comprise a grommet assembly that connects to elongated apertures defined in the mounting frame. As the cooking surface expands and contracts, the grommet assembly slides within the elongated aperture. Through the use of the elongated aperture, dimensional changes in the cooking surface are not directly translated to the mounting frame.

In another aspect of the invention, a method for coupling a cooking surface to a mounting frame can comprise providing elongated apertures in the mounting frame whereby a floating mounting assembly can couple the cooking surface to the mounting frame. The method can further comprise allowing the floating mounting assembly to slide within the elongated apertures as the cooking surface expands and contracts in response to cooking temperature changes. In this way, forces associated with the dimensional changes of the cooking surface are not directly translated to the mounting frame.

The above summary is not intended to describe each illustrated embodiment or every implementation of the invention. Rather, the embodiments are chosen and described so that others skilled in the art can appreciate and understand the principles and practices of the invention. The figures and the detailed description that follow more particularly exemplify these embodiments.

BRIEF DESCRIPTION OF THE DRAWINGS

Subject matter hereof may be more completely understood in consideration of the following detailed description of various embodiments in connection with the accompanying figures, in which:

FIG. 2 is a top view of a mounting frame of the countertop appliance of FIG. 1.

FIG. 3 is an exploded, perspective view of the countertop appliance of FIG. 1.

FIG. 5 is an enlarged view of an elongated aperture located on the mounting frame of FIG. 2.

FIG. 6 is a perspective view of a floating mount assembly.

FIG. 7 is an exploded perspective view of the floating mount assembly of FIG. 6.

Figure 1:
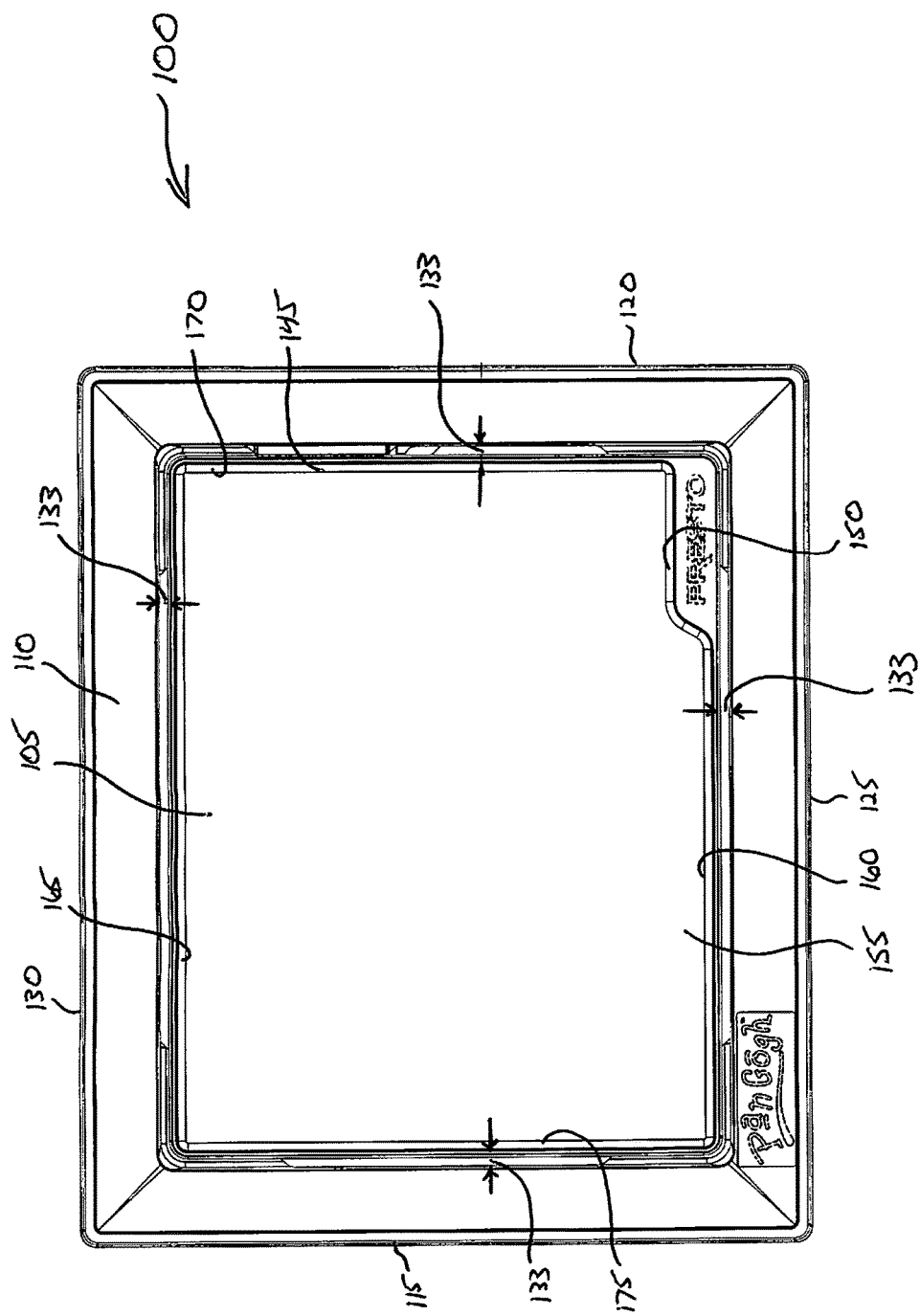
FIG. 1 is a top view of a countertop appliance according to an embodiment of the present invention.

While the invention is amenable to various modifications and alternative forms, specifics thereof have been shown by way of example in the drawings and will be described in detail. It should be understood, however, that the intention is not to limit the invention to the particular embodiments as described. On the contrary, the intention is to cover all modifications, equivalents, and alternatives falling within the spirit and scope of the invention as defined by the appended claims.

DETAILED DESCRIPTION OF THE DRAWINGS

Referring generally to FIGS. 1-4, a countertop appliance 100 of the present invention generally comprises a cooking surface 105 and a mounting frame 110. Generally, the countertop appliance 100 can comprise a skillet or alternatively, griddles as shown in FIGS. 1-4. Countertop appliance 100 can be fabricated of materials suited for food contact and capable of withstanding elevated temperatures. Cooking surface 105 is generally fabricated of typical cooking surface materials such as, for example, aluminum, stainless steel, and the like and can be treated or include coatings to provide non-stick qualities. Mounting frame 110 is generally fabricated of non- or low conducting materials such that a user can handle the countertop appliance 100 without fear of being burned. Mounting frame 110 can be fabricated of suitable polymeric materials such as, for example, nylon, polyester resin, phenolic resin and the like. Mounting frame 110 generally includes a left side wall 115, a right side wall 120, a front wall 125, and a rear wall 130. A gap 133 is defined between the cooking surface 105 and the mounting frame 110. Preferably, gap 133 is uniform around the cooking surface 105 such that the size of gap 133 changes uniformly on all sides as heat is applied or removed from the cooking surface 105. Feet 135 can be attached to the bottom frame surface 140 at front and rear locations of the left side wall 115 and right side wall 120.

Figure 4:
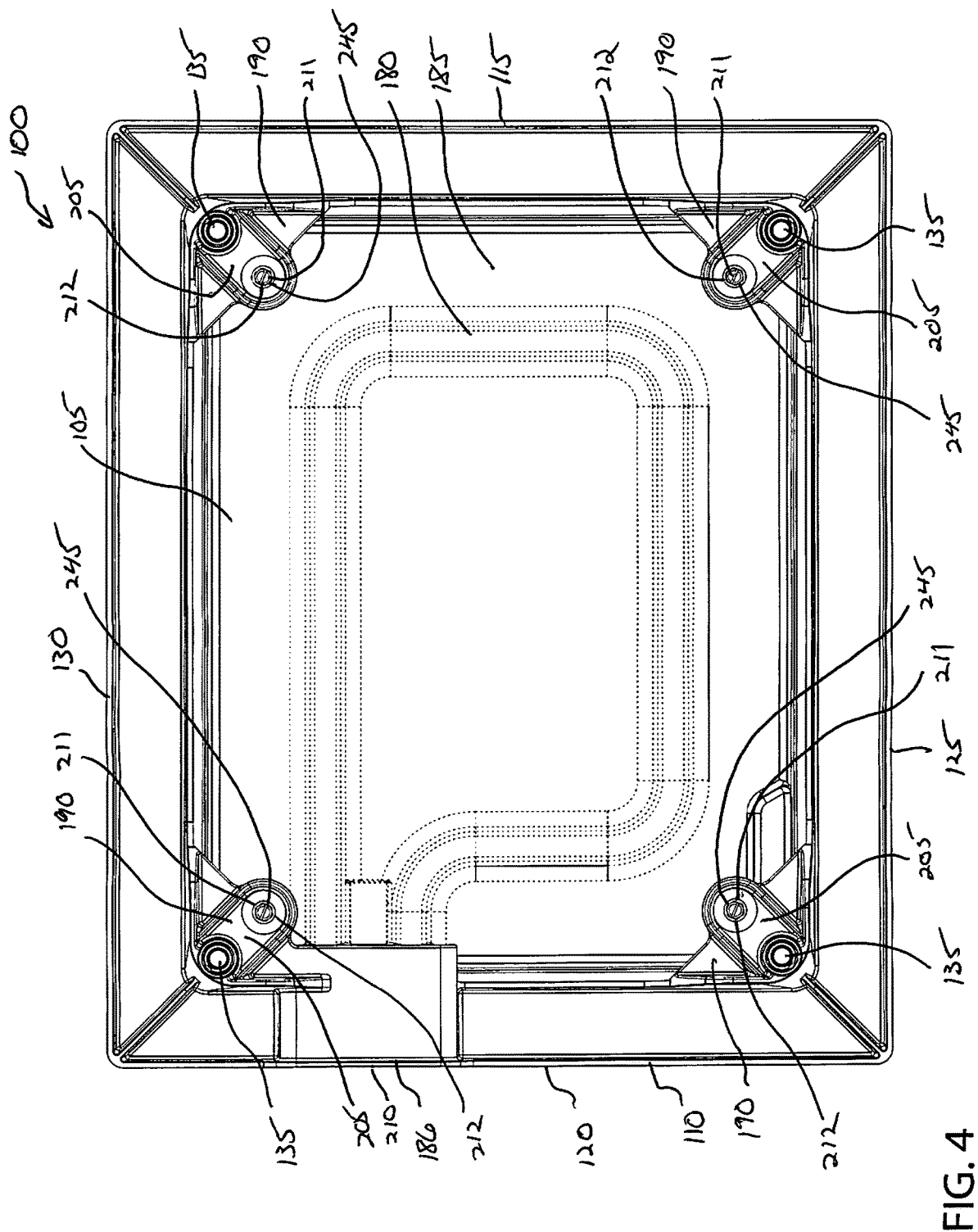
FIG. 4 is a bottom view of the griddle of FIG. 1.

As best illustrated in FIGS. 3 and 4, cooking surface 105 generally includes a raised lip 145 that fully surrounds a cooking perimeter 150 of an upper cooking surface 155. Upper cooking surface 155 preferably includes a non-stick coating such that food being cooked does not stick to the cooking surface 105 and to facilitate easy cleaning of the cooking surface 105. Raised lip 145 generally defines an upwardly facing front lip 160, an upwardly facing rear lip 165, and upwardly facing right lip 170, and an upwardly facing left lip 175. A resistive heating element 180 is mounted to the bottom cooking surface 185 such that heat energy is conducted through the cooking surface 105 for cooking food on the upper cooking surface 155. Resistive heating element 180 is operably connected to an electrical receptacle 186 wherein a power cord can be connected such that electrical energy is supplied to the resistive heating element 180.

As best illustrated in FIGS. 2 and 4, a frame mounting assembly 190 exists at each corner of the mounting frame 110. An elongated aperture 195 is located in the frame mounting assembly 190 and extends from the upper mounting assembly surface 200 to the bottom mounting assembly surface 205. One embodiment of the frame mounting assembly 190 includes a receiving block 210 for the electrical receptacle 186. Elongated aperture 195 has a width 206 and a length 207 as defined in FIG. 5 with the length 207 being greater than the width 206. Elongated aperture 195 is oriented relative to the mounting frame 110 such that length 207 is parallel with an α-axis. A mounting angle 209 is the angle defined between the α-axis and a β-axis, wherein the β-axis is defined as being parallel to the front wall 125 or the rear wall 130 depending on which side of the mounting frame 110 the frame mounting assembly 190 is attached. Mounting angle 209 can range from between about 20° to about 70°. In a preferred embodiment, the mounting angle 209 can be approximately 31°.

As illustrated in FIGS. 3, 6 and 7, a floating mount assembly 211 can comprise a grommet mounting configuration 212 having a bottom washer 215, top washer 220, grommet 225, sleeve 230, and screw 235. Sleeve 230 extends through and floats within the elongated aperture 195 to maintain spacing, thereby allowing cooking surface 105 to float relative to the mounting frame 110 in response to expansion and contraction of the cooking surface 105. Screw 235 secures the cooking surface 105 to the mounting frame 110. To secure the cooking surface 105 to the mounting frame 110, screw 235 is positioned vertically with threads 240 above screw head 245. Screw 235 then enters through the aforementioned elements in the following order: bottom washer 215, elongated aperture 205, sleeve 230, grommet 225, and top washer 220. Screw 235 finally enters into female connector 250 on the bottom cooking surface 185.

With the cooking surface 105 coupled to the mounting frame 110, each floating mount assembly 211 slides within the corresponding elongated aperture 195 in response to temperature changes experienced by the cooking surface 105. Due to the mounting angle 209, the floating mount assembly 211 is essentially allowed to move side to side relative to left side wall 115 and right said wall 120 and forward and back relative to front wall 125 and rear wall 130 as the cooking surface 105 expands and contracts. As the cooking surface 105 and mounting frame 110 are formed of different materials having different thermal expansion characteristics, the elongated apertures 195 allow the cooking surface 105 to expand and contract without the floating mount assemblies 211 translating these forces directly to the mounting frame 110.

Various embodiments of systems, devices, and methods have been described herein. These embodiments are given only by way of example and are not intended to limit the scope of the claimed inventions. It should be appreciated, moreover, that the various features of the embodiments that have been described may be combined in various ways to produce numerous additional embodiments. Moreover, while various materials, dimensions, shapes, configurations and locations, etc. have been described for use with disclosed embodiments, others besides those disclosed may be utilized without exceeding the scope of the claimed inventions.

Persons of ordinary skill in the relevant arts will recognize that the subject matter hereof may comprise fewer features than illustrated in any individual embodiment described above. The embodiments described herein are not meant to be an exhaustive presentation of the ways in which the various features of the subject matter hereof may be combined. Accordingly, the embodiments are not mutually exclusive combinations of features; rather, the various embodiments can comprise a combination of different individual features selected from different individual embodiments, as understood by persons of ordinary skill in the art. Moreover, elements described with respect to one embodiment can be implemented in other embodiments even when not described in such embodiments unless otherwise noted.

Although a dependent claim may refer in the claims to a specific combination with one or more other claims, other embodiments can also include a combination of the dependent claim with the subject matter of each other dependent claim or a combination of one or more features with other dependent or independent claims. Such combinations are proposed herein unless it is stated that a specific combination is not intended.

Any incorporation by reference of documents above is limited such that no subject matter is incorporated that is contrary to the explicit disclosure herein. Any incorporation by reference of documents above is further limited such that no claims included in the documents are incorporated by reference herein. Any incorporation by reference of documents above is yet further limited such that any definitions provided in the documents are not incorporated by reference herein unless expressly included herein.

For purposes of interpreting the claims, it is expressly intended that the provisions of 35 U.S.C. § 112(f) are not to be invoked unless the specific terms "means for" or "step for" are recited in a claim.

The invention claimed is:

1. A countertop appliance, comprising:
a cooking surface formed of a heat conductive material;
a mounting frame forming a rectangular perimeter around the cooking surface, the mounting frame including elongated mounting apertures located at each corner of the rectangular perimeter;
wherein each elongated mounting aperture defines an elongated opening defining an opening axis, the opening axis defining a mounting angle relative to a front wall and a rear wall of the mounting frame, wherein the mounting angle is neither parallel nor perpendicular to an axis defined by the front wall or the rear wall; and
a floating mount assembly corresponding to each elongated mounting aperture, and adapted to engage the corresponding elongated mounting aperture to operably couple the cooking surface to the mounting frame, whereby the heat conductive material of the cooking surface is allowed to expand and contract in response to temperature changes without translating said expansion and contraction to the mounting frame.

2. The countertop appliance of claim 1, wherein the mounting angle is between a range of about 20° to about 70° relative to the axis defined by the front wall or the rear wall.

3. The countertop appliance of claim 1, wherein the floating mount assembly comprises a grommet mount assembly.

4. The countertop appliance of claim 3, wherein the cooking surface defines a female connector on a bottom surface of the cooking surface and wherein the grommet mounting assembly is rotatably coupled to the female connector.

5. The countertop appliance of claim 1, wherein the cooking surface defines a griddle or a skillet.

6. A method for accommodating expansion of a cooking surface in a countertop appliance, comprising:
coupling a cooking surface with a floating mount assembly to a mounting frame forming a rectangular perimeter comprising elongated mounting apertures located at each corner of the rectangular perimeter wherein each elongated mounting aperture defines an elongated opening defining an opening axis, the opening axis defining a mounting angle relative to a front wall and a rear wall of the mounting frame, wherein the mounting angle is neither parallel nor perpendicular to an axis defined by the front wall or the rear wall; and
sliding the floating mount within the elongated aperture defined in the mounting frame such that the floating mount travels along a path that is neither parallel nor perpendicular to an axis defined by the front wall or the rear wall in response to expansion and contraction of the cooking surface due to temperature changes on the cooking surface.

7. The method of claim 6, wherein the mounting angle is between a range of about 20° to about 70° relative to a front wall or a rear wall.

8. The method of claim 6, wherein the floating mount assembly comprises a grommet mount assembly.

9. The method of claim 8, wherein the cooking surface defines a female connector on a bottom surface of the cooking surf ace and wherein the step of coupling the cooking surface to the mounting frame further comprises:
rotatably coupling the grommet mounting assembly to the female connector.

10. The method of claim 6, wherein the step of coupling the cooking surface to the mounting frame defines a griddle or a skillet.

11. The method of claim 6, wherein the step of coupling the cooking surface to the mounting frame further comprises:
defining a gap between the cooking surface and the mounting frame.

* * * * *